(12) United States Patent
Kim et al.

(10) Patent No.: US 11,178,466 B2
(45) Date of Patent: Nov. 16, 2021

(54) DISPLAY DEVICE AND CONTROL METHOD THEREFOR

(71) Applicant: LG ELECTRONICS INC., Seoul (KR)

(72) Inventors: Changhoe Kim, Seoul (KR); Woojin Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/975,694

(22) PCT Filed: Feb. 28, 2018

(86) PCT No.: PCT/KR2018/002437
§ 371 (c)(1),
(2) Date: Aug. 25, 2020

(87) PCT Pub. No.: WO2019/168217
PCT Pub. Date: Sep. 6, 2019

(65) Prior Publication Data
US 2020/0404387 A1    Dec. 24, 2020

(51) Int. Cl.
*H04N 21/422* (2011.01)
*H04N 21/6332* (2011.01)
(Continued)

(52) U.S. Cl.
CPC ... *H04N 21/6332* (2013.01); *H04N 21/42226* (2013.01); *H04N 21/436* (2013.01); *H04N 21/4432* (2013.01); *H04N 21/488* (2013.01)

(58) Field of Classification Search
None
See application file for complete search history.

(56) References Cited

U.S. PATENT DOCUMENTS 9,024,726 B2 * 5/2015 Park ............... H04N 21/42221
340/10.1
9,055,259 B2 * 6/2015 An ................. H04N 21/41265
(Continued)

FOREIGN PATENT DOCUMENTS

KR    1020140064141    5/2014
KR    1020150056273    5/2015
(Continued)

OTHER PUBLICATIONS

PCT International Application No. PCT/KR2018/002437, Notification of Transmittal of the International Search Report and the Written Opinion of the International Searching Authority, or Declaration dated Nov. 28, 2018, 13 pages.

(Continued)

*Primary Examiner* — William J Kim
(74) *Attorney, Agent, or Firm* — Lee, Hong, Degerman, Kang & Waimey

(57) ABSTRACT

The present invention may provide a display device that automatically configures a remote controller so that an external device connected to the display device can be controlled. According to the present display device, a power control code can be recognized on the basis of a response of a connected external device, and a control code set corresponding to the power control code can be received through a server. When there are a plurality of control code sets corresponding to the power control code, the corresponding control code sets can be received through the server by performing comparison with a user interface included in the video image received from the external device.

14 Claims, 15 Drawing Sheets

(51) Int. Cl.
  *H04N 21/436* (2011.01)
  *H04N 21/443* (2011.01)
  *H04N 21/488* (2011.01)

(56) References Cited

U.S. PATENT DOCUMENTS

| | | | | |
|---|---|---|---|---|
| 2011/0102158 A1* | 5/2011 | Haughawout | .... | H04N 21/42204 340/12.29 |
| 2013/0088332 A1* | 4/2013 | Park | ..................... | H04N 21/472 340/10.1 |
| 2015/0137959 A1 | 3/2015 | Kim et al. | | |
| 2018/0012485 A1 | 1/2018 | Park et al. | | |
| 2018/0249112 A1* | 8/2018 | Kim | ................ | H04N 21/42204 |
| 2018/0270525 A1* | 9/2018 | Yu | ................... | H04N 21/42204 |

FOREIGN PATENT DOCUMENTS

| | | |
|---|---|---|
| KR | 1020170025400 | 3/2017 |
| KR | 1020170082008 | 7/2017 |
| KR | 101816723 | 1/2018 |
| KR | 101816723 B1 * | 1/2018 |
| KR | 1020180004959 | 1/2018 |

OTHER PUBLICATIONS

European Patent Office Application Serial No. 18907579.9, Search Report dated Aug. 9, 2021, 7 pages.

* cited by examiner

Apply power control code to set top box (a)

| Power control code type | Set top box model | Channel change code | Banner type |
|---|---|---|---|
| A | a1 | $H_1 04$ | |
| A | a2 | $H_2 05$ | |
| A | a3 | $H_3 04$ | |
| B | b1 | $H_4 05$ | |
| B | b2 | $H_5 07$ | |
| B | b3 | $H_6 06$ | |
| C | c1 | $H_7 15$ | |
| C | c2 | $H_8 20$ | |

(a)

(b)

(c)

DISPLAY DEVICE AND CONTROL METHOD THEREFOR

CROSS-REFERENCE TO RELATED APPLICATIONS

This application is the National Stage filing under 35 U.S.C. 371 of International Application No. PCT/KR2018/002437, filed on Feb. 28, 2018, the contents of which are all hereby incorporated by reference herein in its entirety.

TECHNICAL FIELD

The present disclosure relates to a display device, and more specifically, to a display device and a control method therefor capable of setting a remote controller of the display device to control an external device when the external device (e.g., a set top box and the like) is connected to the display device.

BACKGROUND ART

A digital TV service using only wired or wireless communication is becoming common. The digital TV service may provide various services that were not able to be provided by an existing analog broadcast service.

For example, an internet protocol television (IPTV), which is a type of the digital TV service, and a smart TV service provide bidirectionality that allows a user to actively select a type of a viewing program, a viewing time, and the like. The IPTV and the smart TV services may provide various additional services, such as Internet search, home shopping, and online games, based on such bidirectionality.

In addition, a TV may be connected to a set top box, which is an example of an external device, may provide various contents such as a broadcast program and the like input from the set top box.

In this connection, in order to control the set top box while using the bidirectional service, it is necessary to set a remote controller of the TV to be able to control the set top box.

However, according to the prior art, a setting process is complicated for controlling the set top box using the remote controller of the TV. Thus, the user is using only a remote controller of the set top box instead of the remote controller of the TV. Therefore, there is a problem that the user is not able to use unique functions (e.g., the bidirectional service and the like) provided by the TV.

DISCLOSURE

Technical Problem

The present disclosure is to solve not only the above-mentioned problem but also other problems described in the specification of the present disclosure.

An embodiment of the present disclosure is intended to identify an external device connected to a display device by transmitting a control code through a remote controller. In particular, it should be identified that the control code transmitted through the remote controller of the display device controls the external device connected to the display device. To this end, the present disclosure uses a power control code. The display device may store a power control code for each external device. Whether the power control code corresponds to the external device connected to the display device may be identified through whether a signal is transmitted from the connected external device when the power control code is transmitted to the external device connected to the display device. In addition, the remote controller may be set by receiving a power control set corresponding to the power control code from a server.

Another embodiment of the present disclosure is to identify the external device connected to the display device through a video image received from the external device when the power control code alone does not identify the external device connected to the display device. The external device may provide a unique user interface, and compare the obtained video image with at least one user interface to identify the matching external devices. In this connection, a solution for obtaining a video image containing a user interface is to be provided.

Technical Solutions

Provided is a display device capable of being connected to at least one external device including a memory for storing a power control code for controlling power of the at least one external device therein, a tuner for receiving a broadcast signal, a display module, an external device interface to be wiredly or wirelessly connected to the at least one external device, a network interface for performing bidirectional communication with a server storing a control code set for controlling the at least one external device, a user input interface for performing bidirectional communication with a remote controller, and a controller for controlling the memory, the tuner, the display module, the external device interface, the network interface, and the user input interface, wherein the controller transmits the power control code to the external device through the remote controller after the at least one external device is connected to the external device interface, receives the control code set including the power control code from the server through the network interface when a signal received from the external device is blocked, and transmits the control code set to the remote controller.

Provided is the display device characterized in that the controller stores the power control code in the memory when the signal transmitted from the external device is blocked in response to the transmitted power control code, and transmits another power control code through the remote controller when the signal is continuously received from the external device.

Provided is the display device characterized in that the controller transmits a video image obtained from the external device or singularity coordinates of the video image to the server through the network interface when there are a plurality of control code sets including the power control code.

Provided is the display device characterized in that the server stores a user interface provided by the at least one external device, and the controller receives a control code set of a specific external device providing a user interface matching the video image or the singularity coordinates of the video image from the server through the network interface.

Provided is the display device characterized in that the video image is a first video image obtained from the external device by re-transmitting the power control code to the external device through the remote controller.

Provided is the display device characterized in that the controller receives the control code set of the specific external device matching the first video image or singularity coordinates of the first video image among a plurality of external devices corresponding to the power control code from the server through the network interface.

Provided is the display device characterized in that the controller receives a specific function code of the external device corresponding to the power control code from the server through the network interface, and the specific function code is different from the power control code.

Provided is the display device characterized in that the video image is a second video image obtained by transmitting the specific function code to the external device through the remote controller.

Provided is the display device characterized in that, when the connected external device is a set top box, the user interface is a banner and the specific function code is a code corresponding to channel up or down control.

Provided is the display device characterized in that the controller provides an external device setting pop-up when the at least one external device is connected to the at least one external device interface.

Provided is the display device characterized in that the controller controls the display module such that the first video image and the second video image are not displayed through the display module.

Provided is a method for controlling a display device capable of being connected to at least one external device including transmitting at least one external device power control code through a remote controller of the display device to an external device connected to the display device, receiving a control code set including the transmitted power control code from a server through a network interface of the display device when a signal received from the external device is blocked, and transmitting the received control code set to the remote controller to set the remote controller.

Provided is a method for controlling a display device capable of being connected to at least one external device including transmitting a power control code for each type to a set top box connected to the display device through a remote controller of the display device, re-transmitting the transmitted power control code to the set top box through the remote controller to obtain a video image from the set top box when a signal transmitted from the set top box is blocked, receiving a control code set of a set top box providing a banner matching the video image from a server through a network interface of the display device, and transmitting the control code set of the set top box providing the banner matching the video image to the remote controller to set the remote controller.

Provided is the method characterized in that the receiving of the control code set includes receiving a channel up or down control code from the server through the network interface when there is no banner matching the video image, transmitting the channel up or down control code to the set top box to obtain a video image again, and receiving a control code set of a set top box matching the video image obtained again.

Advantageous Effects

Effects of a mobile terminal according to the present disclosure are as follows.

According to at least one of embodiments of the present disclosure, a solution of identifying the external device through the power control code transmitted to the external device connected to the display device and a reaction of the external device and setting the remote controller of the display device is provided.

In addition, according to at least one of the embodiments of the present disclosure, a solution of identifying the external device through the video image when the external device is not identified using only the power control code is provided.

In addition, according to at least one of the embodiments of the present disclosure, a solution of obtaining at least one video image from the external device is provided.

A further scope of applicability of the present disclosure will become apparent from a detailed description below. However, because various changes and modifications within the spirit and scope of the present disclosure may be clearly understood by those skilled in the art, the detailed description and a specific embodiment such as a preferred embodiment of the present disclosure should be understood as given only as examples.

DESCRIPTION OF DRAWINGS

FIG. 12 is a diagram illustrating information stored by a server according to an embodiment of the present disclosure.

BEST MODE

Figure 1:
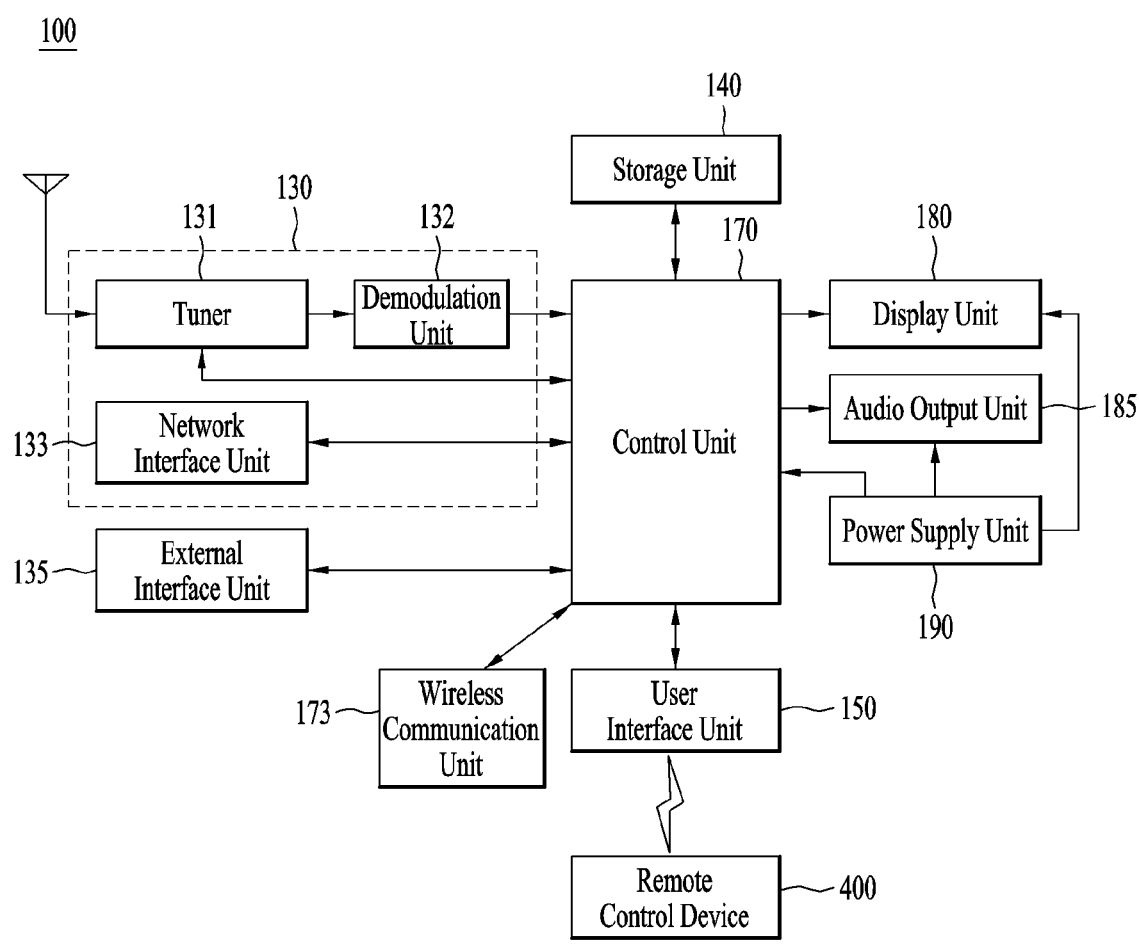
FIG. 1 is a block diagram illustrating a configuration of a display device according to an embodiment of the present disclosure.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with or to" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

A display device according to an embodiment, for example, as an intelligent display device having both of the broadcast reception function and the computer assisted function, may include more convenient user-friendly interface than a handwriting input device, a touch screen or space remote control device, and the like, by adding an Internet function while fulfilling a broadcasting receiving function. With the support of a wired or wireless Internet function, the display device can connect to the Internet and computers and perform functions such as e-mail, web browsing, banking, or games. In order to perform such various functions, standardized general-purpose OS can be used.

Accordingly, since various applications are freely added or deleted on a general purpose OS kernel, a display device described herein can perform various user-friendly functions. More specifically, the display device may be, for example, a network TV, a Hybrid Broadcast Broadband TV (HBBTV), a smart TV, a light-emitting diode (LED) TV, an organic light-emitting diode (OLED) TV, and so on, and may be applied to a smartphone in some cases.

FIG. 1 is a block diagram illustrating a configuration of a display device according to an embodiment of the present disclosure.

Referring to FIG. 1, the display device 100 may include a broadcast reception unit 130, an external device interface unit 135, a storage unit 140, a user input interface unit 150, a control unit 170, a wireless communication unit 173, a display unit 180, an audio output unit 185, and a power supply unit 190.

The broadcast reception unit 130 may include a tuner 131, a demodulation unit 132, and a network interface unit 133.

The tuner 131 may select a specific broadcast channel according to a channel selection command. The tuner 131 may receive broadcast signals for the selected specific broadcast channel.

The demodulation unit 132 may divide the received broadcast signals into video signals, audio signals, and broadcast program related data signals and restore the divided video signals, audio signals, and data signals to an output available form.

The external device interface unit 135 may receive an application or an application list of an adjacent external device and transfer the application or the application list to the control unit 170 or the storage unit 140.

The external device interface unit 135 may provide a connection path between the display device 100 and an external device. The external device interface unit 135 may receive at least one of image and audio output from an external device that is wirelessly or wiredly connected to the display device 100 and deliver it to the control unit 170. The external device interface unit 135 may include a plurality of external input terminals. The plurality of external input terminals may include an RGB terminal, at least one High Definition Multimedia Interface (HDMI) terminal, and a component terminal.

An image signal of an external device input through the external device interface unit 135 may be output through the display unit 180. A sound signal of an external device input through the external device interface unit 135 may be output through the audio output unit 185.

An external device connectable to the external device interface unit 135 may be one of a set-top box, a Blu-ray player, a DVD player, a game console, a sound bar, a smartphone, a PC, a USB memory, and a home theater system, but these are just exemplary.

The network interface unit 133 may provide an interface for connecting the display device 100 to a wired/wireless network including the Internet network. The network interface unit 133 may transmit or receive data to or from another user or another electronic device through an accessed network or another network linked to the accessed network.

Additionally, the network interface unit 133 may transmit a part of content data stored in the display device 100 to a user or an electronic device selected from other users or other electronic devices preregistered in the display device 100.

The network interface unit 133 may access a predetermined webpage through an accessed network or another network linked to the accessed network. That is, the network interface unit 133 may access the predetermined webpage through the network and transmit or receive data to or from a corresponding server.

The network interface unit 133 may receive content or data provided by a content provider or a network operator. That is, the network interface unit 133 may receive content (e.g., movies, advertisements, games, VOD, broadcast signals, etc.) and content-related information provided by the content provider or the network operator through the network.

Additionally, the network interface unit 133 may receive update information and update files of firmware provided by the network operator and may transmit data to the Internet or content provider or the network operator.

The network interface unit 133 may select and receive a desired application among applications, which are open to the public, through the network.

The storage unit 140 may store a program for signal processing and control in the control unit 170 and may store signal-processed image, voice, or data signals.

Additionally, the storage unit 140 may perform a function for temporarily storing images, voices, or data signals input from the external device interface unit 135 or the network interface unit 133 and may store information on a predetermined image through a channel memory function.

The storage unit 140 may store an application or an application list input from the external device interface unit 135 or the network interface unit 133.

The display device 100 may play content files (e.g., moving image files, still image files, music files, document files, application files, etc.) stored in the storage unit 140 so as to provide the content files to the user.

The user input interface unit 150 may transfer signals input by the user to the control unit 170 or may transfer signals from the control unit 170 to the user. For example, the user input interface unit 150 may process control signals for power on/off, channel selection, screen setting, or the like, which is received from the remote control device 200, or transmit the control signals from the control unit 170 to the remote control device 200, according to various communication schemes such as Bluetooth scheme, an Ultra Wideband (WB) scheme, a ZigBee scheme, a Radio Frequency (RF) communication scheme, or an infrared (IR) communication scheme.

Additionally, the user input interface unit 150 may transfer, to the control unit 170, control signals input from local keys (not shown) such as a power key, a channel key, a volume key, and a setting key.

Image signals that are image-processed by the control unit 170 may be input to the display unit 180 and displayed as an image corresponding to the image signals. Additionally, image signals that are image-processed by the control unit 170 may be input to an external output device through the external device interface unit 135.

Voice signals that are processed by the control unit 170 may be output to the audio output unit 185. Additionally, voice signals that are processed by the control unit 170 may be input to an external output device through the external device interface unit 135.

In addition, the control unit 170 may control overall operations of the display device 100.

Additionally, the control unit 170 may control the display device 100 by a user command or internal program input through the user input interface unit 150 and may access the network to download an application or an application list desired by the user into the display device 100.

The control unit 170 may output channel information selected by the user through the display unit 180 or the audio output unit 185 together with the processed images or voice signals.

Additionally, the control unit 170 may output image signals or voice signals, which are input from the external device (e.g., a camera or a camcorder) through the external device interface unit 135, to the display unit 180 or the audio output unit 185 according to an external device image playback command received through the user input interface unit 150.

On the other hand, the control unit 170 may control the display unit 180 to display images. For example, the control unit 170 may control the display unit 180 to display broadcast images input through the tuner 131, external input images input through the external device interface unit 135, images input through the network interface unit, or images stored in the storage unit 140. In this case, an image displayed on the display unit 180 may be a still image or video, and may be a 2D image or a 3D image.

Additionally, the control unit 170 may perform control to play content stored in the video display device 100, received broadcast content, or external input content input from the outside. The content may be in various formats, such as broadcast images, external input images, audio files, still images, accessed web screens, and document files.

The wireless communication unit 173 may perform a wired or wireless communication with an external electronic device. The wireless communication unit 173 may perform short-range communication with an external device. To this end, the wireless communication unit 173 can support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communication unit 173 may support wireless communication between the display device 100 and a wireless communication system, between the display device 100 and another display device 100, or between networks including the display device 100 and another display device 100 (or an external server) through wireless area networks. The wireless area networks may be wireless personal area networks.

Herein, the other display device 100 may be a mobile terminal such as a wearable device (for example, a smart watch, a smart glass, and a head mounted display (HMD)) or a smartphone, which is capable of exchanging data (or interworking) with the display device 100. The wireless communication unit 173 can detect (or recognize) a communicable wearable device around the display device 100. Furthermore, if the detected wearable device is a device authenticated to communicate with the display device 100, the control unit 170 may transmit at least part of data processed in the display device 100 to the wearable device through the wireless communication unit 173. Accordingly, a user of the wearable device may use the data processed in the display device 100 through the wearable device.

The display unit 180 may convert image signals, data signals, or on-screen display (OSD) signals, which are processed in the control unit 170, or images signals or data signals, which are received in the external device interface unit 135, into R, G, and B signals to generate driving signals.

Furthermore, the display device 100 shown in FIG. 1 is just one embodiment of the present disclosure, and thus, some of the components shown in FIG. 1 may be integrated, added, or omitted according to the specification of the actually implemented display device 100.

That is, if necessary, two or more elements may be integrated into one element, or one element may be divided into two or more elements. Additionally, a function performed by each block is provided for describing the embodiments of the present disclosure, and a specific operation or device thereof does not limit the scope of the present disclosure.

According to another embodiment of the present disclosure, the display device 100 may not include the tuner 131 and the demodulation unit 132, unlike that illustrated in FIG. 1, and may receive images through the network interface unit 133 or the external device interface unit 135 and play the received images.

For example, the display device 100 may be divided into an image processing device such as a set-top box for receiving broadcast signals or content according to various network services, and a content playback device for playing content input from the image processing device.

In this case, an operating method of a display device according to an embodiment of the present disclosure, as described below, may be performed by one of the display device 100 described with reference to FIG. 1, an image processing device such as the separated set-top box, and a content playback device including the display unit 180 and the audio output unit 185.

Figure 2:
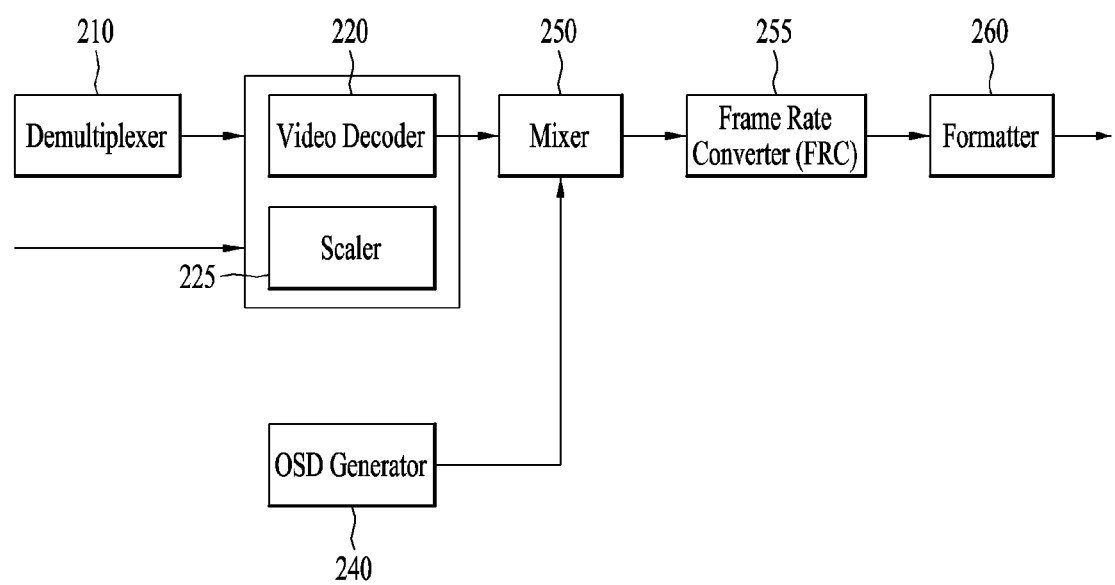
FIG. 2 is a block diagram showing the detailed configuration of each of controller (170) of FIG. 1 according to one embodiment of the present invention.

FIG. 2 is a block diagram showing the detailed configuration of each of controller (170) of FIG. 1 according to one embodiment of the present invention.

One example of the controller may include a demultiplexer 210, a video processor 220, an OSD generator 240, a mixer 250, a frame rate converter (FRC) 255, and a formatter 260. Besides, the controller may further include an audio processor and a data processor (not shown).

The demultiplexer 210 demultiplexes an inputted stream. For instance, the demultiplexer 210 can demultiplex an inputted stream signal into an MPEG-2 TS video, audio and data signals. Herein, the stream signal inputted to the demultiplexer may include a stream signal outputted from the tuner, demodulator or external device interface.

The video processor 220 performs a video processing of the demultiplexed video signal. To this end, the video processor 220 may include a video decoder 225 and a scaler 235.

The video decoder 225 can decode the demultiplexed video signal, and the scaler 235 can scale the resolution of the decoded video signal to be outputtable from the display.

The video decoder 225 can support various specifications. For instance, the video decoder 225 performs a function of MPEG-2 decoder if a video signal is encoded by MPEG-2. And, the video decoder 325 performs a function of H.264 decoder if a video signal is encoded by DMB (digital multimedia broadcasting) or H.264.

Meanwhile, the video signal decoded by the image processor 220 is inputted to the mixer 250.

The OSD generator 240 may generate OSD data according to a user input or by itself. For example, the OSD generator 340 may generate data to be displayed on the screen of the display in the graphic or text form on the basis of a control signal of a user input interface. The generated OSD data may include various data such as a user interface screen of the display device, various menu screens, widgets, icons, viewing rate information and the like. The OSD generator 240 can generate data to display a caption of a broadcast video or EPG based broadcast information.

The mixer 250 mixes the OSD data generated by the OSD generator 240 and the video signal processed by the video processor 220. The mixer 250 then provides the mixed signal to the formatter 260. By mixing the decoded video signal and the OSD data, OSD is displayed in a manner of overlaying a broadcast video or an external input video.

The frame rate converter (FRC) 255 may convert a frame rate of an inputted video. For example, the frame rate converter 255 can convert the frame rate of an inputted 60 Hz video into a frame rate of 120 Hz or 240 Hz according to an output frequency of the display unit. As described above, there may exist various methods of converting a frame rate. For instance, in case of converting a frame rate into 120 HZ from 60 Hz, the frame rate converter 255 can perform the conversion by inserting a first frame between the first frame and a second frame or inserting a third frame predicted from the first and second frames. For another instance, in case of converting a frame rate into 240 Hz from 60 Hz, the frame rate converter 255 can perform the conversion by further inserting three same or predicted frames between the existing frames. Meanwhile, in case of not performing a separate frame conversion, the frame rate converter 255 may be bypassed.

The formatter 260 may change the output of the frame rate converter 255, which is inputted thereto, to fit an output format of the display unit. For example, the formatter 260 can output an RGB data signal. In this case, this RGB data signal can be outputted as low voltage differential signal (LVDS) or mini-LVDS. If an inputted output of the frame rate converter 255 is a 3D video signal, the formatter 260 outputs the signal by configuring a 3D format to fit the output format of the display unit, whereby a 3D service can be supported through the display unit.

Meanwhile, an audio processor (not shown) in the controller can perform audio processing of a demultiplexed audio signal. Such an audio processor (not shown) can provide supports to process various audio formats. For instance, if an audio signal is encoded in format of MPEG-2, MPEG-4, AAC, HE-AAC, AC-3, BSAC, or the like, a corresponding decoder is further included to process the audio signal.

And, the audio processor (not shown) in the controller can process base, treble, volume adjustment and the like.

A data processor (not shown) in the controller can process a demultiplexed data signal. For example, when a demultiplexed data signal is encoded, the data processor can decode the encoded demultiplexed data signal. Here, the encoded data signal may be EPG information including broadcast information such as start and end times of a broadcast program broadcasted on each channel, and the like.

Meanwhile, the above-described digital device is one example according to the present invention. And, at least one of the components may be integrated, added or omitted depending on options of an actually embodied digital device. In particular, if necessary, at least two or more components can be integrated into a single component or a prescribed component can be divided into at least two or more components. Moreover, a function performed by each block is provided to describe one embodiment of the present invention. A detailed operation or device for the function may non-limit the scope of the appended claims and their equivalents of the present invention.

Meanwhile, a digital device may include an image signal processing device configured to process a signal of an image saved in the corresponding device or a signal of an inputted image. Examples of the image signal processing device may include a settop box (STB) failing to include the display unit 180 and the audio output unit 185 shown in FIG. 1, the aforementioned DVD player, a Blu-ray player, a game device, a computer and the like.

Figure 3:
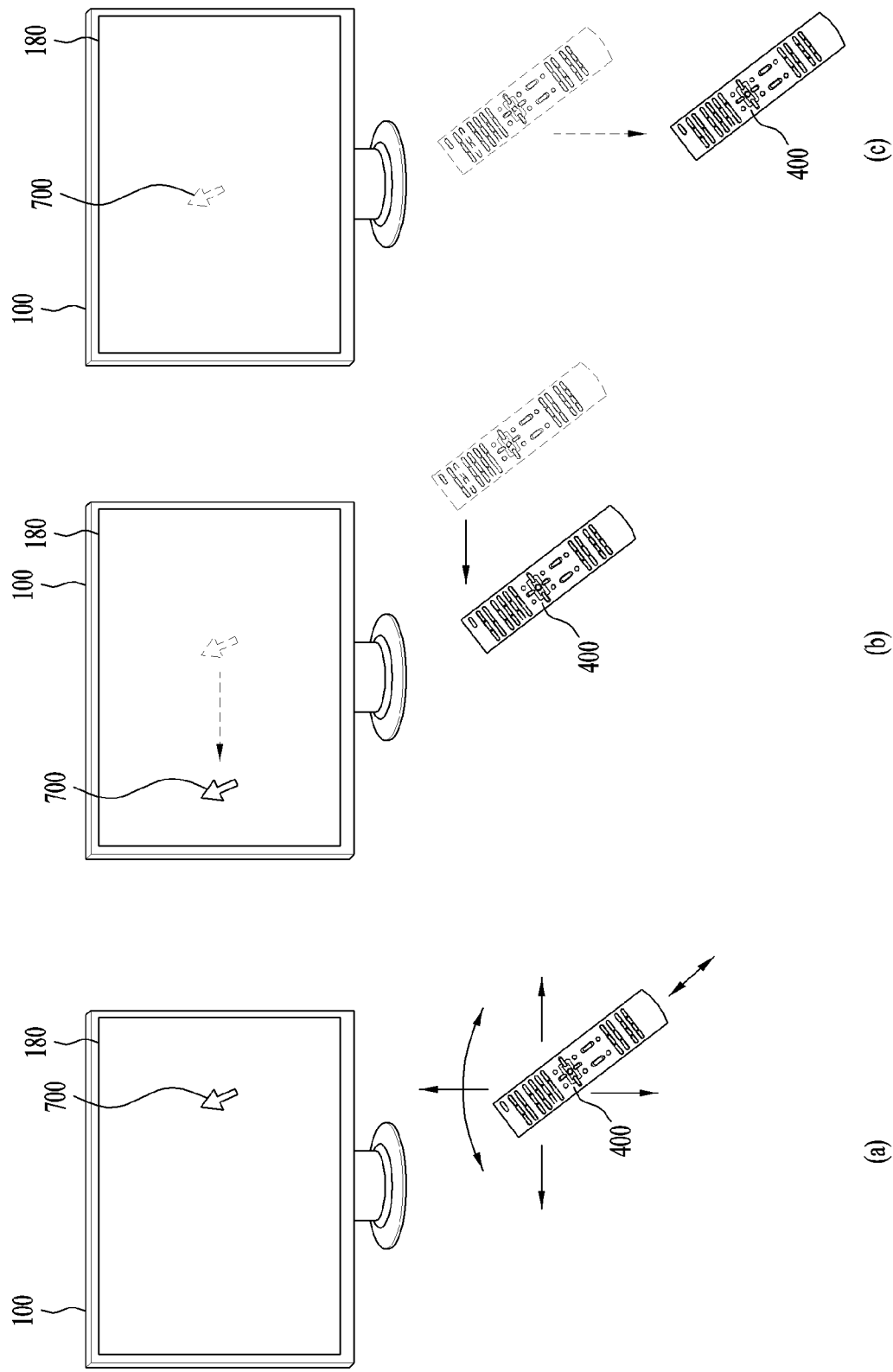
FIG. 3 illustrates the remote controller for controlling the display in accordance with an embodiment of the present invention.

FIG. 3 illustrates the remote controller for controlling the display in accordance with an embodiment of the present invention.

As described in FIG. 3(*a*), a pointer (700) corresponding to the remote controller 400 is displayed in a display module (180).

A user can then move or rotate the remote controller 400 in the upward and downward direction and in the leftward and rightward direction as shown in FIG. 3(*b*) and in the forward and backward direction as shown in FIG. 3(*c*). Such a remote controller 400 also moves in a 3D space to move the corresponding pointer 700, and thus may be referred to as a space remote controller.

In addition, FIG. 3(*b*) illustrates that, when the user moves the remote controller 400 leftwards, the pointer 700 displayed on the display 180 of the image display apparatus moves leftwards corresponding to movement of the remote controller 400.

Further, information regarding movement of the remote controller 400 sensed by a sensor of the remote controller 400 is transmitted to the image display apparatus. The image display apparatus can also calculate coordinates of the pointer 700 from the information regarding movement of the remote controller 400, and then display the pointer 700 so as to correspond to the calculated coordinates.

Further, FIG. 3(*c*) illustrates the user moving the remote controller 400 away from the display 180 while the user presses a specific button of the remote controller 400. Thereby, a selection region in the display 180 corresponding to the pointer 700 can be zoomed in, thus being enlarged. On the other hand, when the user moves the remote controller 400 towards the display 180, the selection region in the display 180 corresponding to the pointer 700 can be zoomed out, thus being reduced. Further, when the remote controller 400 moves away from the display 180, the selection region can be zoomed out, and when the remote controller 400 moves towards the display 180, the selection region can be zoomed in.

In addition, during a specific button on the remote controller 400 is selected, the recognition of up/down/left/right movement may be excluded. In other words, when the remote controller 400 moves away from or approaches the display module 180, it does not recognize the up, down, left, and right movements, but only the forward and backward movements. When a specific button in the remote controller 400 is not pressed, the pointer 700 is moved according to the up, down, left, and right movement of the remote controller 400.

Furthermore, the moving speed or moving direction of the pointer 700 may correspond to the moving speed or moving direction of the remote controller 400.

Meanwhile, in the present specification, the pointer 700 refers to an object displayed on the display module 180 in response to the operation of the remote controller 400. Accordingly, objects of various shapes other than the shape of the arrow shown in the drawing are possible with the pointer 700. For example, it may be a concept including a point, a cursor, a prompt, and a thick outline. In addition, the pointer 700 may be displayed in correspondence with any one of a horizontal axis and a vertical axis on the display module 180 as well as a plurality of points such as a line and a surface.

Figure 4:
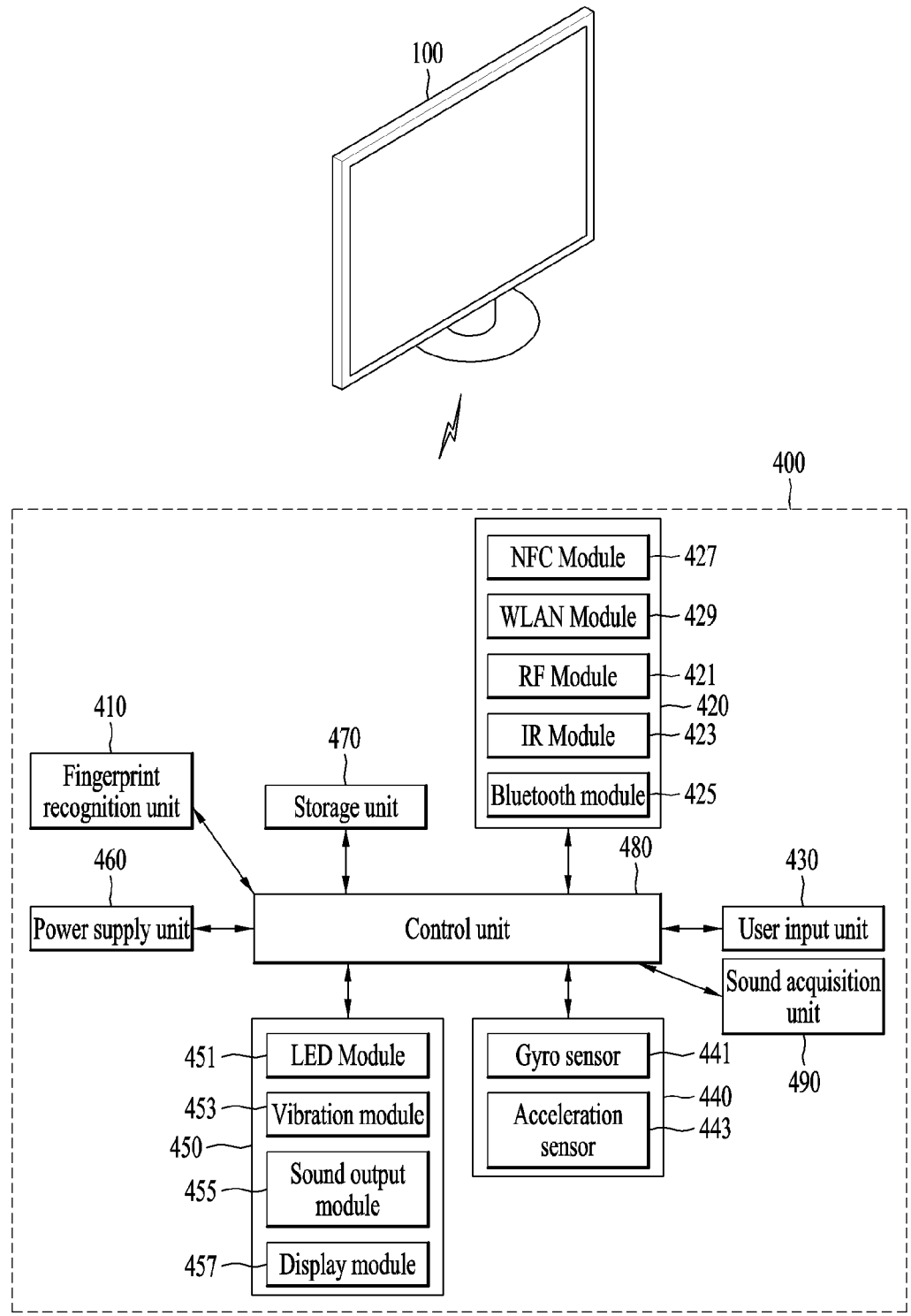
FIG. 4 is a block diagram of the remote control device according to an embodiment of the present disclosure.

FIG. 4 is a block diagram of the remote control device according to an embodiment of the present disclosure.

As described in FIG. 4, the remote control device 400 may include a fingerprint recognition unit 410, a wireless communication unit 420, a user input unit 430, a sensor unit 440, an output unit 450, a power supply unit 460, a storage unit 470, a control unit 480.

The wireless communication unit 420 transmits/receives signals to/from any one of the display devices according to the above-mentioned embodiments of the present disclosure.

The remote control device 400 may include an RF module 421 for transmitting/receiving signals to/from the display device 100 according to an RF communication standard and an IR module 423 for transmitting/receiving signals to/from the display device 100 according to an IR communication standard. Additionally, the remote control device 400 may include a Bluetooth module 425 for transmitting/receiving signals to/from the display device 100 according to a Bluetooth communication standard. Additionally, the remote control device 400 may include a Near Field Communication (NFC) module 427 for transmitting/receiving signals to/from the display device 100 according to an NFC communication standard and a WLAN module 429 for transmitting/receiving signals to/from the display device 100 according to a Wireless LAN (WLAN) communication standard.

Additionally, the remote control device 400 may transmit signals containing information on a movement of the remote control device 400 to the display device 100 through the RF module (421).

On the other hand, the remote control device 400 may receive signals transmitted from the display device 100 through the RF module 421 and, if necessary, may transmit a command on power on/off, channel change, and volume change to the display device 100 through the IR module 423.

The user input unit 430 may include a keypad, a button, a touch pad, or a touch screen. A user may manipulate the user input unit 430 to input a command related to the video display device 100 to the remote control device 400. If the user input unit 430 includes a hard key button, a user may push the hard key button to input a command related to the display device 100 to the remote control device 400. If the user input unit 430 includes a touch screen, a user may touch a soft key of the touch screen to input a command related to the display device 100 to the remote control device. Additionally, the user input unit 430 may include various types of input means that can be manipulated by a user, for example, a scroll key and a jog key, and this embodiment does not limit the scope of the present disclosure.

The sensor unit 440 may include a gyro sensor 441 or an acceleration sensor 443.

The gyro sensor 441 may sense information on a movement of the remote control device 400.

For example, the gyro sensor 441 may sense information on an operation of the remote control device 400 on the basis of x, y, and z axes, and the acceleration sensor 443 may sense information on a moving speed of the remote control device 200. Moreover, the remote control device 400 may further include a distance measurement sensor and sense a distance to the display unit 180 of the display device 100.

The output unit 450 may output image or voice signals in response to manipulation of the user input unit 430 or image or voice signals corresponding to signals transmitted from the display device 100. A user can recognize whether the user input unit 430 is manipulated or the video display device 100 is controlled through the output unit 450.

For example, the output unit 450 may include an LED module 451 for flashing, a vibration module 453 for generating vibration, a sound output module 455 for outputting sound, or a display module 457 for outputting an image, if the user input unit 430 is manipulated or signals are transmitted/received to/from the display device 100 through the wireless communication unit 420.

Additionally, the power supply unit 460 supplies power to the remote control device 400 and, if the remote control device 400 does not move for a predetermined time, stops supplying power, so that power waste can be reduced. The power supply unit 260 may resume the power supply if a predetermined key provided at the remote control device 400 is manipulated.

The storage unit 470 may store various types of programs and application data necessary for control or operation of the remote control device 200. If the remote control device 400 transmits/receives signals wirelessly through the display device 100 and the RF module 421, the remote control device 400 and the display device 100 transmit/receive signals through a predetermined frequency band. The control unit 480 of the remote control device 400 may store, in the storage unit 470, information on a frequency band for transmitting/receiving signals wirelessly to/from the video display device 100 paired with the remote control device 400 and refer to the information.

The control unit 480 controls general matters related to control of the remote control device 400. The control unit 480 may transmit a signal corresponding to a predetermined key manipulation of the user input unit 430 or a signal corresponding to a movement of the remote control device 400 sensed by the sensor unit 440 to the display device 100 through the wireless communication unit 420.

Figure 5:
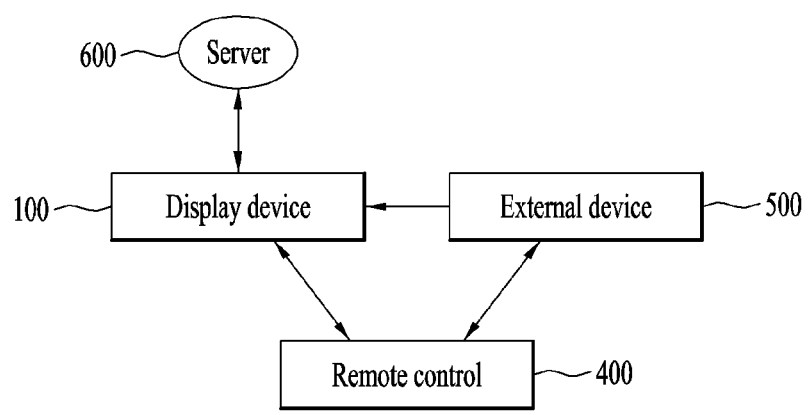
FIG. 5 is a view for illustrating a configuration of an entire system including a display device according to an embodiment of the present disclosure.

FIG. 5 is a view for illustrating a configuration of an entire system including a display device according to an embodiment of the present disclosure.

Referring to FIG. 5, an entire system including a display device according to an embodiment of the present disclosure may include a display device 100, an external device 500, a remote controller 400, a server 600, and the like.

In order to control the external device 500 connected to the display device 100 through the remote controller 400 that performs bidirectional communication, a control code set different for each manufacturer or each model of the connected external device 500 must be transmitted to the remote controller 400. In this connection, a RF module 421 shown in FIG. 4 may be used for bidirectional communication between the display device 100 and the remote controller 400.

The control code set may correspond to an IR signal transmitted from the remote controller 400 to control the external device 500.

The IR signal may include a lead code, a custom code, and a data code.

The custom code may include information on the manufacturer of the external device controlled by the remote controller 400.

The data code may include information on a function of each key. For example, the data code may include information on the function of each key, such as a key whose number corresponds to number 1, a key corresponding to volume increase, or the like.

The server 600 may store the control code set that controls the external device 500. Because various control code sets exist based on the manufacturers, the models, or related operators of the various external devices 500, the server 600 may store the plurality of control code sets.

In addition, the server 600 may include user interface information provided by the external device 500 and store the user interface information provided by the external device 500 to correspond to the control code set of the corresponding external device 500.

A user interface may be image information that is output through a display module of the display device 100 when the external device 500 is connected to the display device 100.

Figure 10:
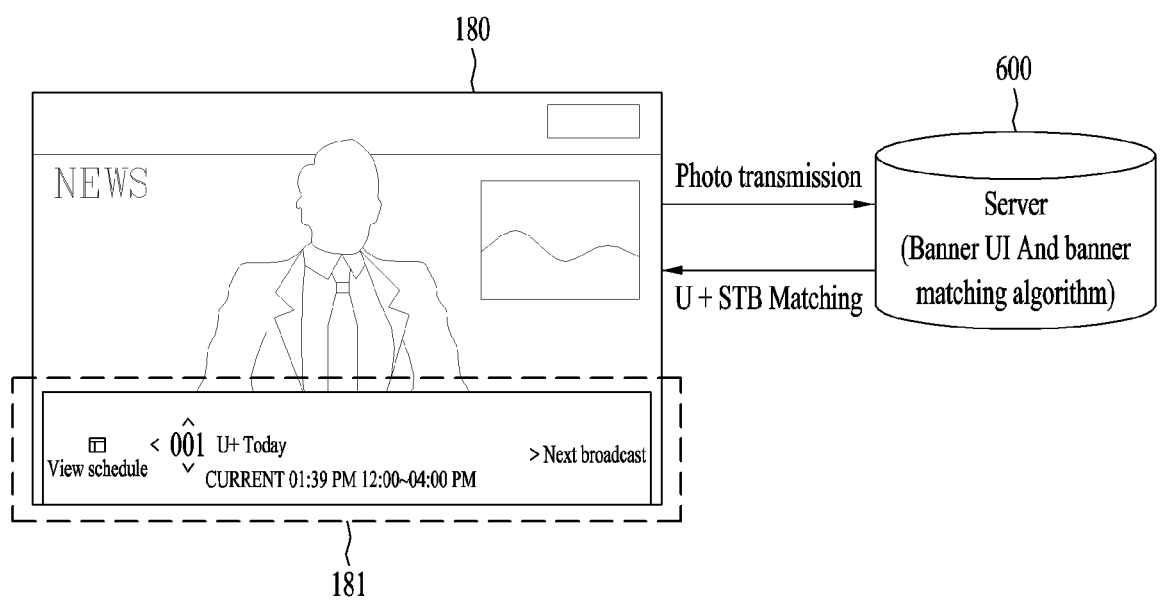
FIG. 10 is a view for illustrating a process of receiving a control code set of a set top box connected to a display device according to another embodiment of the present disclosure.

In this connection, the illustrated user interface corresponds to a banner 181 shown in FIG. 10, which is received from a set top box that is an example of the external device 500 connected to the display device 100.

The user interface may be different depending on the connected external device, and each external device may provide at least one user interface.

The server 600 may include an algorithm for determining whether the user interface is contained in a video image received from the display device 100, and an external device providing the user interface contained in the video image may be identified through the algorithm.

That is, the server 600 may recognize the external device 500 connected to the display device 100 using a specific IR signal to which the external device reacts and the user interface contained in the video image, and transmit the control code set of the external device 500 connected to the display device 100 to the remote controller 400.

The display device 100 may control the external device 500 connected through the remote controller 400 by transmitting the received control code set to the remote controller 400.

Figure 6:
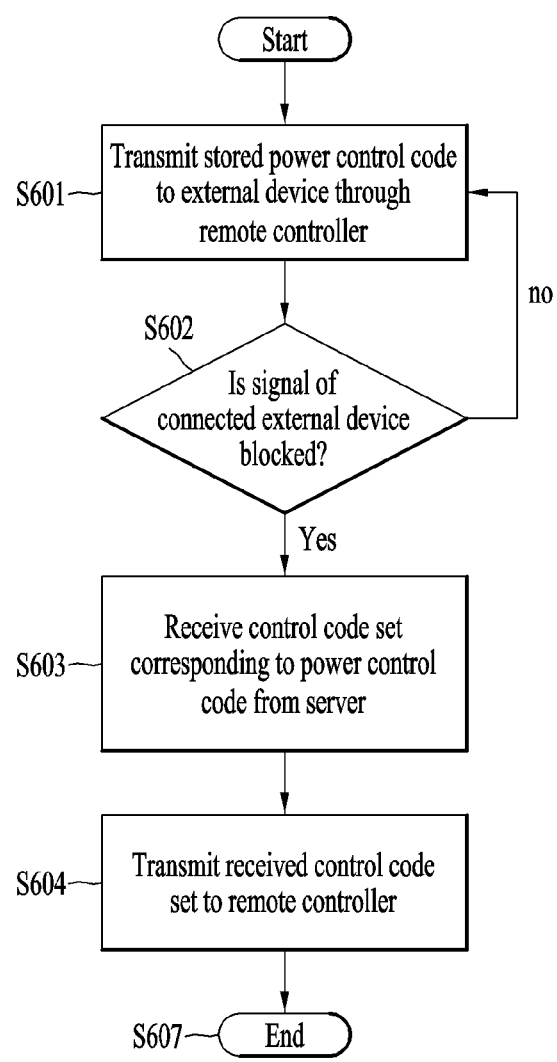
FIG. 6 is a flowchart for illustrating a remote controller setting method according to an embodiment of the present disclosure.

FIG. 6 is a flowchart for illustrating a method for setting the remote controller 400 (see FIG. 5) according to an embodiment of the present disclosure.

The display device 100 (see FIG. 5) may communicate bidirectionally with the server 600 (see FIG. 5), and the remote controller may be set to control the external device 500 (see FIG. 5) connected to the display device.

The display device that sets the remote controller to control the connected external device while communicating with the server may be connected to at least one external device, and may include a memory that stores a power control code for controlling power of the at least one external device, a tuner that receives a broadcast signal, an external device interface to be connected to the at least one external device wiredly or wirelessly, a network interface that performs bidirectional communication with the server that stores a control code set of the at least one external device, a user input interface that performs bidirectional communication with the remote controller, and a controller that controls the memory, the tuner, the display module, the external device interface, the network interface, and the user input interface.

After the at least one external device is connected to the external device interface, the controller may transmit the pre-stored power control code to the external device through the remote controller (S601). The operation of S601 may be performed as soon as the display device and the external device are connected to each other, or the operation may be performed in response to a specific request (e.g., user's selection) after the connection is made.

However, it is also within the scope of the present disclosure that a test is performed while the power control code is transmitted directly from the display device to the external device without going through the remote controller.

More specifically, the controller may transmit one of the stored power control codes after the external device to which power is applied is connected and a signal is sensed from the external device.

When the signal received from the connected external device is blocked in response to the applied power code (S602, YES), the controller may recognize the power control code of the connected external device through a reaction of the connected external device.

In addition, the controller may store the recognized power control code in the memory.

The case in which the signal received from the external device is blocked means, for example, a case in which the external device is normally turned off in response to the transmitted power code.

The controller is designed, when continuing to receive the signal from the connected external device even after transmitting one of the pre-stored power control codes to the external device through the remote controller (S603, NO), to recognize that the external device does not react corresponding to the transmitted power control code and to transmit pre-stored another power control code to the external device through the remote controller.

That is, the controller may transmit the pre-stored power control code to the external device through the remote controller, and recognize that a power on/off operation of the connected external device connected to the display device is able to be performed based on the transmitted power control code when the signal received from the external device is blocked.

When the power control code is transmitted and a power status of the external device is changed accordingly (S602, Yes) (that is, when the display device no longer receives the signal from the external device that was turned on), the controller may transmit the power control code to the server and receive the control code set including the power control code from the server (S603).

The controller may transmit the control code set to the remote controller to set the remote controller of the display device to control the external device.

However, the flowchart in FIG. 6 assumes that all the external devices have different power control codes, respectively. Therefore, a technology for distinguishing external devices having the same power control code but having different control codes for a specific function is additionally required.

Hereinafter, another embodiment for distinguishing the connected external devices when there are a plurality of control code sets including the power control code will be described.

Figure 7:
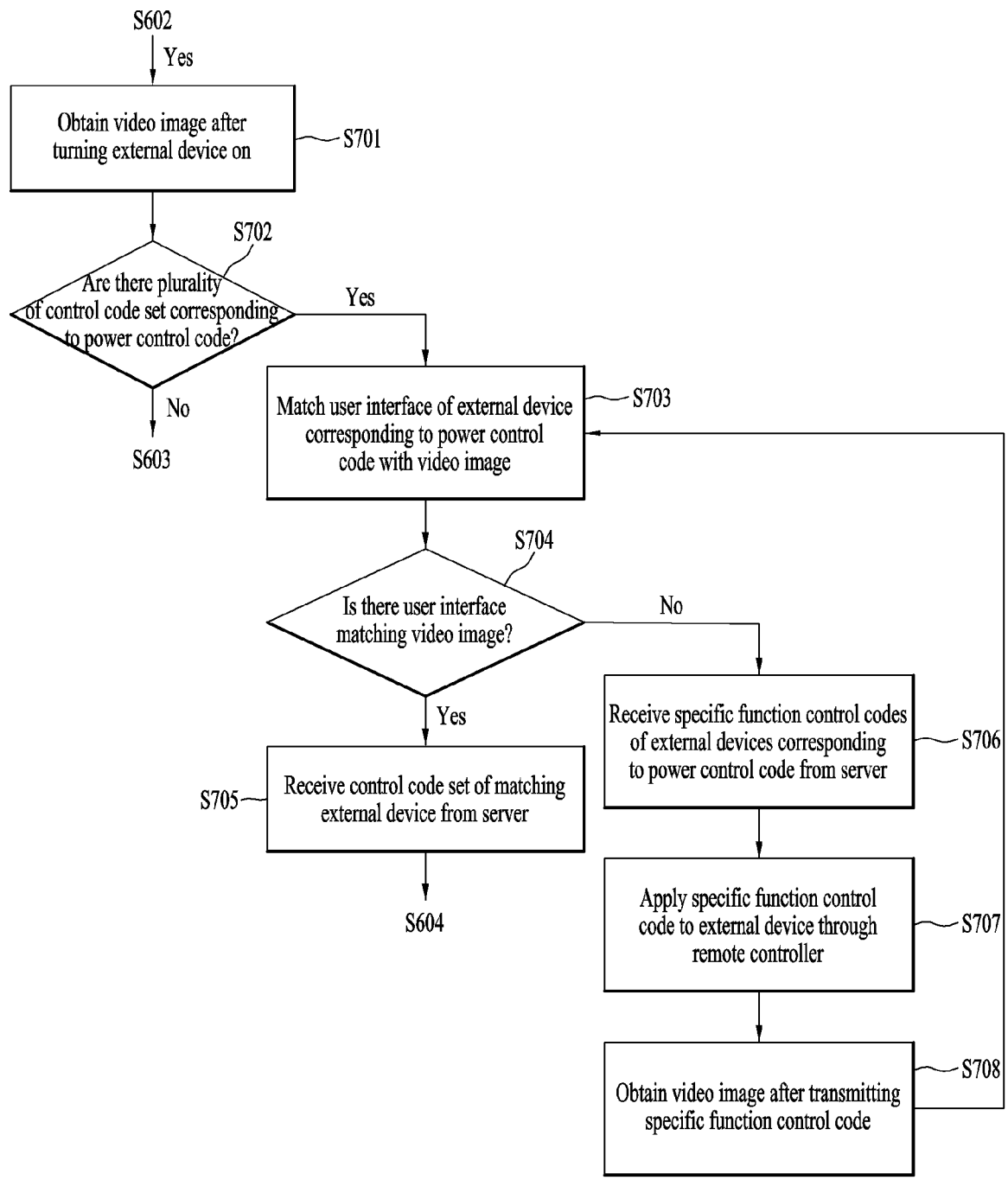
FIG. 7 is a flowchart for illustrating a remote controller setting method according to another embodiment of the present disclosure.

FIG. 7 is a flowchart for illustrating a method for setting the remote controller 400 (see FIG. 5) according to another embodiment of the present disclosure.

In a basic content in FIG. 7, when there are the plurality of control code sets including the power control code, the controller of the display device may distinguish the external device connected to the display device through the video image obtained from the external device.

To this end, the controller of the display device may transmit the video image obtained from the external device or singularity coordinates of the video image to the server through the network interface.

When transmitting the singularity coordinates of the video image to the server, a data capacity is small, which reduces a time required to set the remote controller and reduces unnecessary data transmission.

A feature of extracting and comparing singularity coordinates of a first video image will be described below in FIGS. 13 and 14.

In this connection, the server stores the user interface provided by the at least one external device. The controller of the display device may receive a control code set of a specific external device that provides a user interface matching the video image or the singularity coordinates of the video image from the server through the network interface.

In the flowchart in FIG. 7, after the external device is turned off in response to the transmitted power control code (S602, Yes), the controller of the display device 100 (see FIG. 5) may re-transmit, to the external device, the transmitted control code through the remote controller to apply the power to the external device, and obtain the video image from the connected external device (S701).

When there is a single control code set corresponding to the power control code (S702, No), the display device may set the remote controller by receiving the control code set without video image comparison.

However, when there are the plurality of control code sets corresponding to the power control code (S702, Yes), it is necessary to distinguish the external device connected to the display device by performing the additional image comparison.

To this end, the server may match the video image obtained after turning the external device on with user interfaces of the plurality of external devices corresponding to the power control code (S703) to determine whether there is a user interface matches the video image.

When there is the user interface matching the video image (S704, Yes), the display device may receive a control code set of an external device that provides the matching user interface from the server (S705), and transmit the control code set to the remote controller (S604) to set the remote controller.

In this connection, the power control code may play a role of reducing candidates of the external devices to be compared with each other by being matched with the video image.

That is, the server may compare the video image with only the external devices corresponding to the power control code to determine whether user interfaces thereof match the video image.

The recognized power control code may serve to reduce the candidates to be compared with each other, thereby reducing the time required to set the remote controller.

That is, the controller of the display device may receive the control code set of the specific external device that matches the video image or the singularity coordinates of the video image among the plurality of external devices corresponding to the power control code from the server through the network interface.

When there is no user interface matching the video image (S704, No), the display device may receive specific function control codes of the plurality of external devices corresponding to the power control code from the server through the network interface (S706).

In this connection, the specific function control code is a function control code different from the power control code.

The display device may transmit the received specific function control code to the external device through the remote controller (S707), and obtain the video image again from the external device (S708).

The display device may receive a user interface of a matching external device from the server through the network based on the video image obtained again.

In this connection, the specific control code in addition to the power control code may also reduce the candidates of the external devices to be compared with the video image obtained again.

The external device may not react because the received specific function control code is different from that of the connected external device.

In this case, the matching user interface does not exist in the video image obtained after transmitting the specific function control code. The process may be repeated as the server receives another specific function control code or a specific control code of another external device.

Hereinabove, the case in which the user interface matching the video image does not exist has been described, but the same flow may be obtained even when there are a plurality of matching user interfaces.

Hereinafter, the embodiment will be described in detail with reference to FIGS. 8 to 12 in consideration of a case in which the at least one external device is a set top box.

Figure 8:
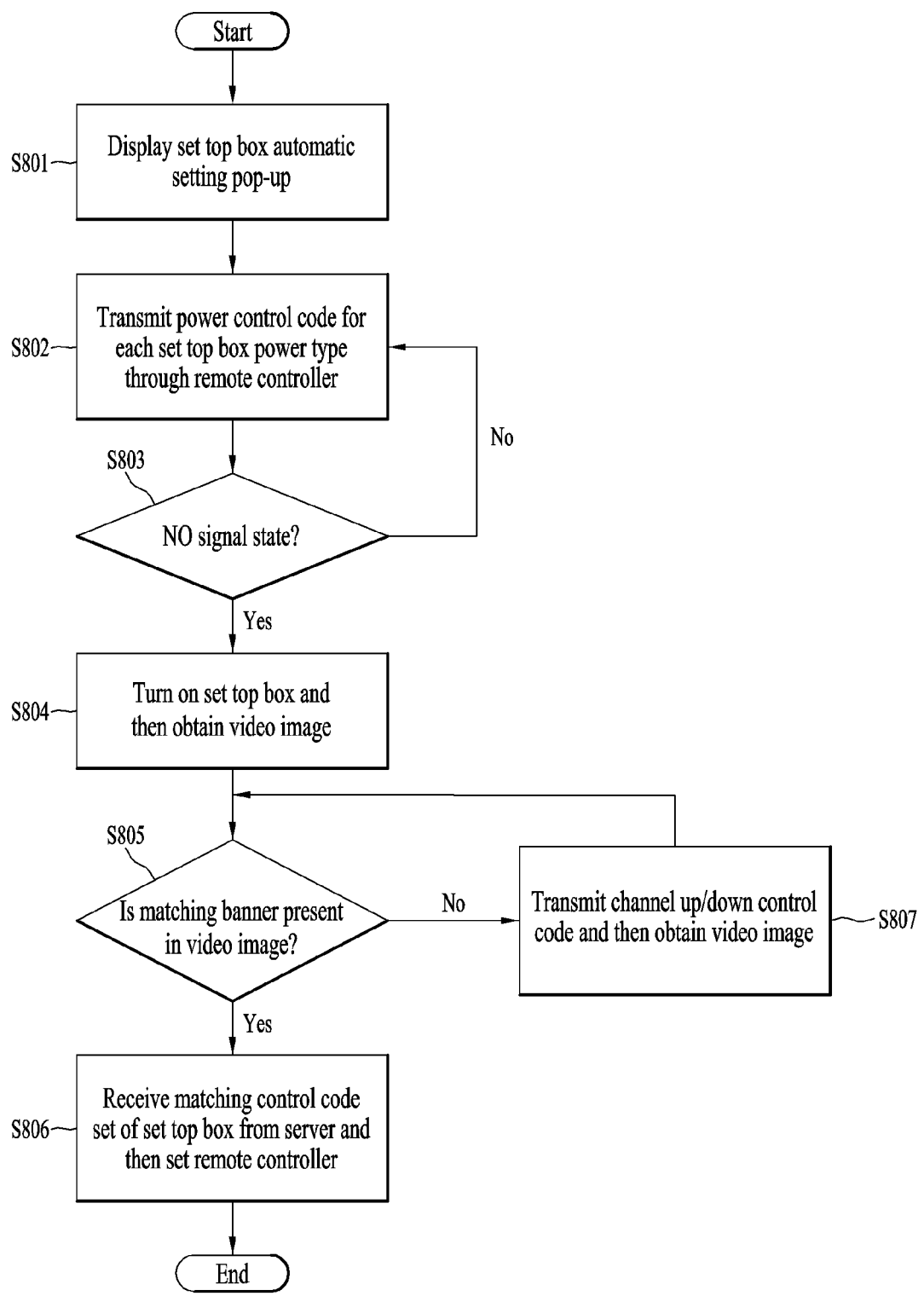
FIG. 8 is a flowchart for illustrating a method for setting a remote controller of a display device to control a set top box according to another embodiment of the present disclosure.

FIG. 8 is a flowchart for illustrating a method for setting the remote controller 400 (see FIG. 5) to control a set top box (the external device, see FIG. 5) according to another embodiment of the present disclosure.

Figure 9:
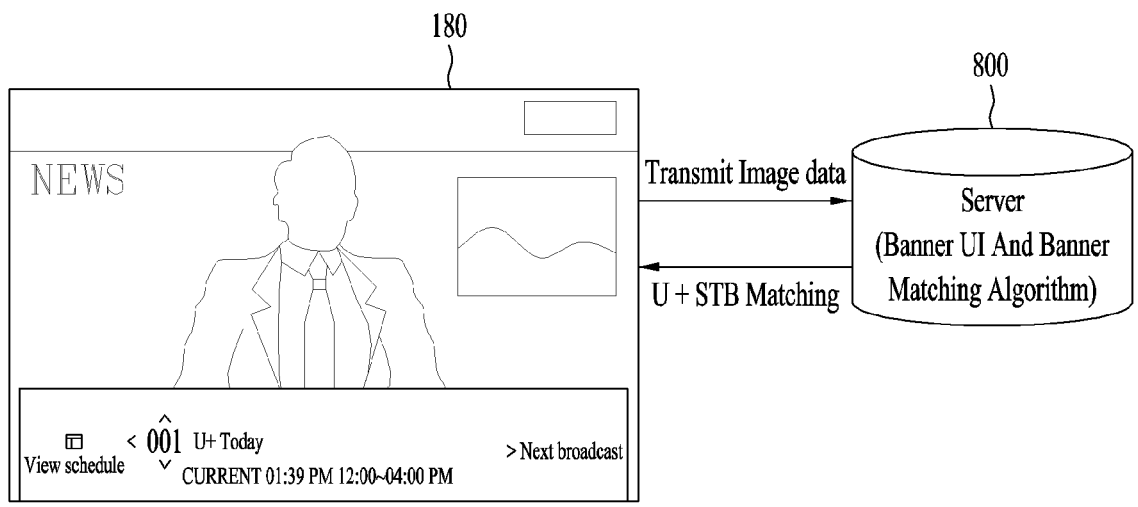
FIG. 9 is a diagram for illustrating a process of recognizing a power control code of a set top box according to another embodiment of the present disclosure.
Figure 9:
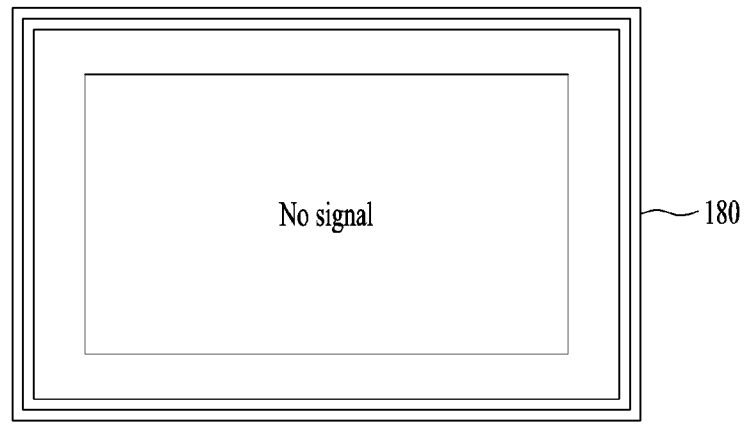

FIG. 9 is a diagram for illustrating a process of recognizing a power control code of a set top box according to another embodiment of the present disclosure.

FIG. 10 is a view for illustrating a process of receiving a control code set of a set top box connected to a display device according to another embodiment of the present disclosure.

Figure 11:
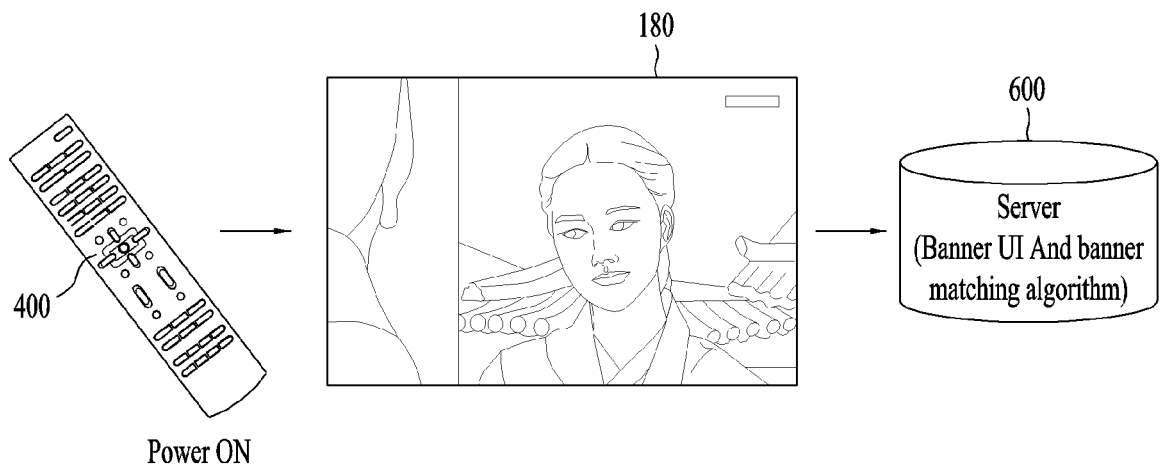
FIG. 11 is a view for illustrating processing in a case in which a banner of a set top box is not output to a display module according to another embodiment of the present disclosure.
Figure 11:
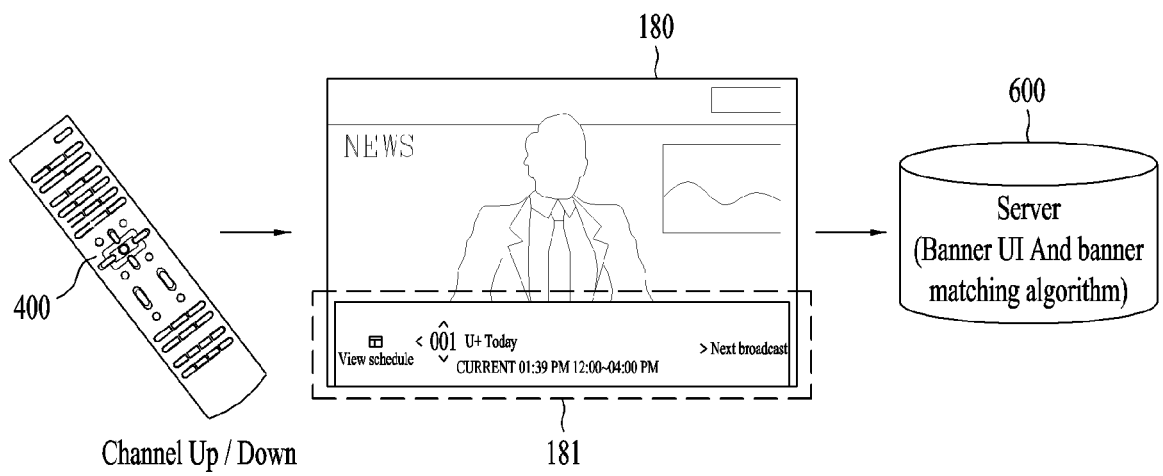

FIG. 11 is a view for illustrating processing in a case in which a banner of a set top box is not output to a display module according to another embodiment of the present disclosure.

FIG. 12 is a diagram illustrating information stored by a server according to an embodiment of the present disclosure.

As shown in FIG. 8, the controller of the display device may provide a remote controller setting pop-up through an user input or automatically provides the remote controller setting pop-up when the external device is connected to an external device interface of the display device (S801).

The controller may set the remote controller in response to user's selection through the setting pop-up or automatically set the remote controller without the user's selection.

In this connection, the setting means a setup process for controlling the external device using, for example, the remote controller of the display device (ex: a TV).

When there is the user's selection performed through the setting pop-up or at the same time when the setting pop-up is displayed, the controller may transmit a power control code for each set top box power type to a connected set top box through the remote controller (S802).

In the case of the set top box, the power control codes are classified based on the types. Therefore, the power control code may serve to reduce candidates of set top boxes to be compared.

When a signal is not received from a set top box to which the display device is connected in response to the transmitted power control code (S803, YES), the power type of the set top box may be recognized, the power control code of the recognized power type may be transmitted to the set top box via the remote controller, and a video image may be obtained from the set top box which is turned on again (S804).

When the display device continuously receives the signal from the set top box in response to the transmitted power control code (S803, No), the display device may transmit a power control code of a different type to the set top box through the remote controller.

A process of identifying the power type of the set top box will be described with reference to FIG. 9. When the power control code is transmitted to the set top box and then the transmitted power control code corresponds to the set top box, "signal-free" may be output on a display module 180 and the display device may identify the power type of the set top box therethrough.

The display device may transmit singularity coordinates of the video image to the server 600 in consideration of a large capacity of the video image.

An embodiment of extracting and comparing the singularity coordinates of the video image will be described with reference to FIGS. 13 and 14 below.

When a banner corresponding to the video image transmitted to the server or the singularity coordinates of the video image is recognized (S805, YES), the display device may receive a matching control code set from the server and transmit the received control code set to the remote controller to set the remote controller (S806).

A process of identifying the matching external device through the video image will be described with reference to FIG. 10. The display device may transmit the obtained video image or singularity coordinates of the video image to the server 600 to receive a control code set of the set top box that provides the matching banner 181.

The server 600 may include a banner user interface provided by the set top box and an algorithm for extracting the banner matching the video image. However, it will also be said that designing the corresponding algorithm to execute the corresponding function without going through the server by storing the corresponding algorithm in the memory of the display device.

However, the banner may not be contained in the video image obtained after applying power to the set top box.

(a) in FIG. 11 shows an embodiment in which the banner is not contained in the image output on the display module 180 after the power is applied to the set top box. In this case, the display device is not able to receive the control code set of the matching set top box even when the obtained video image is transmitted to the server 600.

Therefore, in preparation for the above-described problem, the display device may transmit a channel change code to the set top box through the remote controller 400 to compare the matching banner again with a changed video image.

That is, when the corresponding banner is not recognized in the video image transmitted to the server or the singularity coordinates of the video image (S805, NO), the display device may apply the channel change control code (e.g., a channel up or down control code and the like) received from the server to the connected set top box, and then obtain a video image to be output on the display module again (S807).

The display device may receive the control code set of the set top box containing the matching banner from the server based on the video image obtained again.

(b) in FIG. 11 shows an embodiment in which the display device transmits the channel up or down control code to the set top box through the remote controller 400, so that the banner 181 is displayed on the display module 180. In this connection, the obtained video image may be transmitted to the server 600 to receive the matching control code set.

Referring to FIG. 12, the display device stores power control code types A, B, C. of the set top box in the memory. A connected power control code type may be recognized based on whether the set top box reacts.

There may be a plurality of set top box models corresponding to the recognized power code type.

When there are the plurality of set top box models corresponding to the recognized power code type, the display device may receive channel change codes of set top boxes having the corresponding power control code type through the server.

The display device may transmit a video image obtained by sequentially applying the received channel change codes of the set top boxes to the server. Further, the server compares a banner type corresponding to the power control code type and a corresponding channel change code with a video image to determine whether the banner type and the video image are matched.

When the compared banner does not match the video image, it may be a case that a channel does not change because the applied channel change code does not correspond to the connected set top box.

In addition, the channel change code may be channel up/down. A video image may be obtained after sequentially applying channel up codes and then compared with the banner type. Further, a video image may be obtained after sequentially applying channel down codes and then compared with the banner type.

When the recognized power code type is A as an example, the server compares banners and video images of set top box models a1, a2, and a3 of the power code type A.

When the video image does not contain the banner, the server may compare a video image, which is obtained by applying channel change codes $H_1 04$, $H_2 05$, and $H_3 04$ of the set top box models having the power code type A one by one, with a banner type of the corresponding power code type A and a corresponding channel change code (e.g., $H_1 04$).

That is, the power code type and the channel change code may play a role of reducing candidates for the comparison between the video image and the banner.

Hereinafter, an embodiment of reducing the time required to set the remote controller by transmitting the singularity coordinates of the video image to the server will be described.

Figure 13:
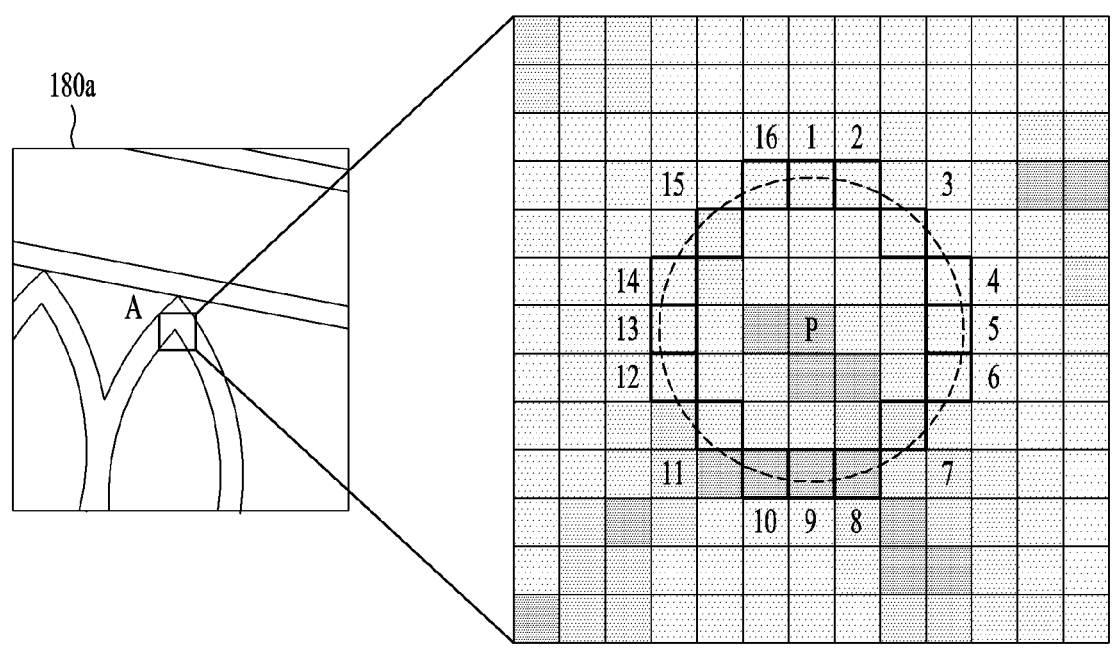
FIG. 13 is a view for illustrating a method for extracting singularity coordinates to recognize a banner provided by a set top box in a video image according to another embodiment of the present disclosure.

FIG. 13 is a view for illustrating a method for extracting singularity coordinates to recognize a banner provided by a set top box in a video image according to another embodiment of the present disclosure.

The display device may use a FAST (Features from Accelerated Segment Test) algorithm to extract the singularity coordinates to be compared with the banner from the obtained video image.

The FAST algorithm is a method for detecting corner points in an image, which is easily used to extract a banner providing a large number of broadcast information in a limited portion. The method for extracting the corner points is not limited to the FAST algorithm.

The display device may select a point P in a specific region A of a screen portion 180a output on the display module, and determine whether the selected pixel P is a corner by comparing the pixel P with 16 pixel values on a circle of a radius 3. When n or more pixels brighter than P by a value equal to or greater than a certain value (>p+t) are consecutive or when n or more pixels darker than P by the value equal to or greater than the certain value (>p+t) are consecutive, P may be determined as the corner point.

Figure 14:
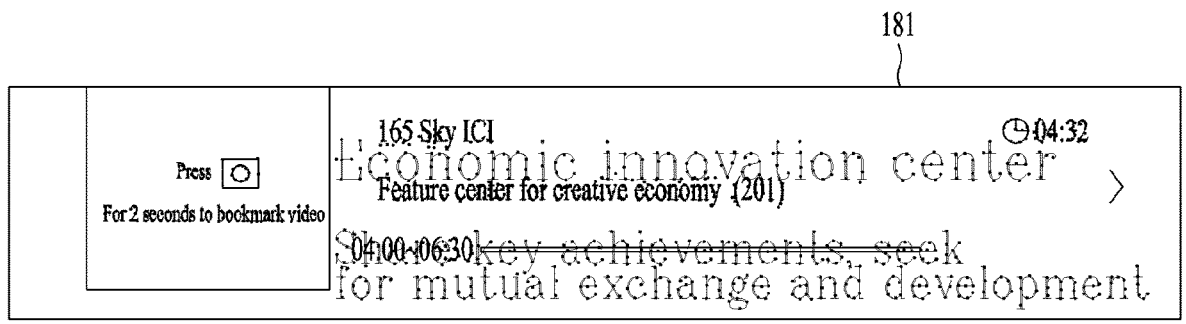
FIG. 14 is a view illustrating an example of recognizing a banner through singularity coordinates extracted according to FIG. 13.
Figure 14:
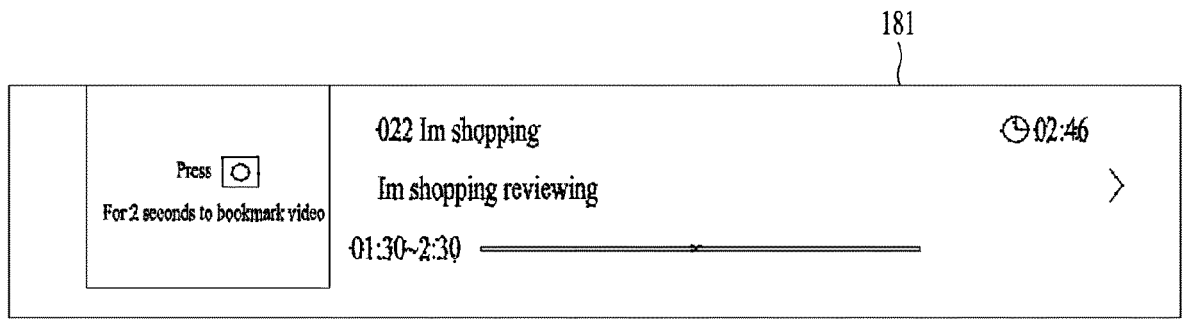
Figure 14:
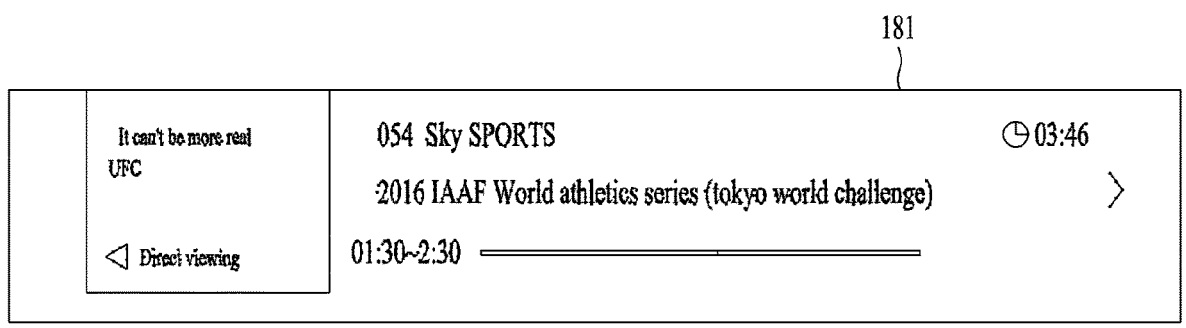

FIG. 14 is a view illustrating an example of recognizing a banner through singularity coordinates extracted according to FIG. 13.

The banner may be superimposed on a broadcast image output on the display module.

(a) in FIG. 14 shows an embodiment in which singularities contained in the broadcast image are extracted together in the banner 181 when the banner 181 is translucent. However, even when the singularities contained in the broadcast image are detected, the algorithm may adjust a degree of matching to find a corresponding banner.

(b) in FIG. 14 shows a case in which the banner 181 is opaque, and (c) in FIG. 14 shows a case in which the singularities are not contained in the broadcast image even when the banner 181 is translucent. In this case, the algorithm may detect the matching set top box with high accuracy.

That is, the display device may transmit the singularity coordinates of the video image to the server through the FAST algorithm or another algorithm, so that the server may extract the corresponding banner type through the singularity coordinates. Because there is no need to transmit the video image of the large capacity, the time required to set the remote controller may be shortened.

In one example, intactly outputting a change of the video image on the display module in the process of setting the remote controller may not be preferable, because it causes confusion to the user.

Hereinafter, an embodiment of outputting a setting pop-up 182 on the display module 180 in the process of setting the remote controller will be described through FIGS. 15 and 16.

Figure 15:
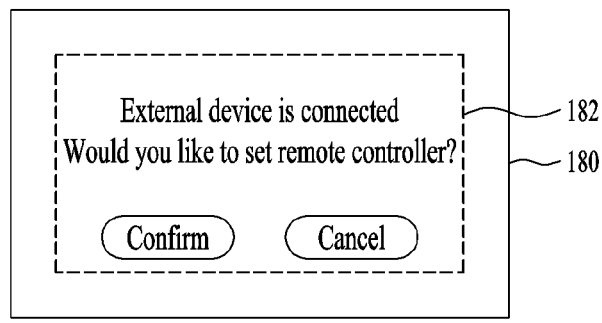
FIG. 15 is a view for illustrating a setting pop-up for external device setting according to another embodiment of the present disclosure.

FIG. 15 is a view for illustrating the setting pop-up 182 for external device setting according to another embodiment of the present disclosure.

A time point of applying the power control code to the external device through the remote controller may be a time when the external device is connected to the display device to receive the signal or a time when the user selects a function of setting the remote controller.

At this time, the controller may provide the setting pop-up 182 for setting the remote controller in response to the connected external device through the display module 180.

When the setting pop-up 182 is provided, a command to set the remote controller may be input from the user or the power control code may be automatically applied to the connected external device.

Figure 16:
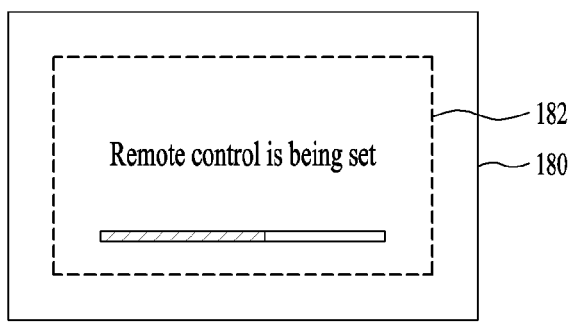
FIG. 16 is a view for illustrating a case in which a setting pop-up lasts in a remote controller setting process.

FIG. 16 is a view for illustrating a case in which the setting pop-up 182 lasts on the display module 180 in a remote controller setting process.

The controller may display the setting pop-up 182 through the display module 180 until the remote controller setting is completed by transmitting the control code set received by the display device to the remote controller.

That is, the controller of the display device may control the display module 180 such that the video image obtained after the set top box is turned on and the video image obtained after the channel change code is applied are not displayed through the display module.

In addition, the setting pop-up may provide a UI for setting the control code set of the external device in response to a key operation of the remote controller after completing the reception of the control code set.

The remote controller may not have a key corresponding to a specific code of the received control code set. In this case, a function of the external device may not be used using the remote controller.

Therefore, the controller may be set, through the setting pop-up, to use a key provided only for the remote controller of the external device through the remote controller in bidirectional communication with the display device.

In addition, the remote controller may be set to apply the control code for each external device connected to the display device.

The controller may transmit the received control code set with information of the external device interface to which the external device is connected to the remote controller.

Accordingly, the remote controller may apply a code for controlling an external device connected to a specific external device interface through a key operation for selecting the specific external device interface or an input through the display module.

For example, in a state in which the control code is set corresponding to the set top box, when a different external device is selected, the remote controller may be controlled to apply a corresponding control code through corresponding external device interface information.

In order to enable such function, the display device must basically store the power control code corresponding to the external device.

Therefore, it is preferable that the display device stores and uploads the corresponding power control code from the external server in the memory through network communication.

The above detailed description should not be construed as limiting in all respects, but should be considered illustrative. The scope of the present disclosure should be determined by rational interpretation of the appended claims, and all changes within the equivalent scope of the present disclosure are included in the scope of the present disclosure.

Furthermore, the present disclosure described above may also be embodied as a computer readable code on a medium in which a program is recorded. The computer-readable medium includes all kinds of recording devices in which data readable by a computer system is stored. Examples of computer-readable media include a hard disk drive (HDD), a solid state disk (SSD), a silicon disk drive (SDD), a ROM, a RAM, a CD-ROM, a magnetic tape, a floppy disk, an optical data storage device, and the like. The examples of computer-readable media also include those implemented in a form of a carrier wave (e.g., transmission over Internet).

In addition, implementing the above-described program in a form stored in a memory of an arbitrary device to which the present disclosure is applied from a server through the Internet or the like not in a form stored in a recording medium also within the scope of the present disclosure.

MODE

In the best mode described above, various embodiments to which the present disclosure may be applied have already been described.

INDUSTRIAL APPLICABILITY

Because the present disclosure may be applied to the display device such as the TV and the STB (set top box), industrial applicability is recognized.

The invention claimed is:

1. A display device capable of being connected to at least one external device, the display device comprising:
a memory for storing a power control code for controlling power of the at least one external device therein;
a tuner for receiving a broadcast signal;
a display module;
an external device interface to be wiredly or wirelessly connected to the at least one external device;
a network interface for performing bidirectional communication with a server storing a control code set for controlling the at least one external device;
a user input interface for performing bidirectional communication with a remote controller; and
a controller for controlling the memory, the tuner, the display module, the external device interface, the network interface, and the user input interface,
wherein the controller is configured to:
transmit the power control code to the at least one external device through the remote controller after the at least one external device is connected to the external device interface;
receive the control code set including the power control code from the server through the network interface when a signal received from the at least one external device is blocked; and
transmit the control code set to the remote controller.

2. The display device of claim 1, wherein the controller is configured to:
store the power control code in the memory when the signal transmitted from the at least one external device is blocked in response to the transmitted power control code; and
transmit another power control code through the remote controller when the signal is continuously received from the at least one external device.

3. The display device of claim 2, wherein the controller is configured to transmit a video image obtained from the at least one external device or singularity coordinates of the video image to the server through the network interface when there are a plurality of control code sets including the power control code.

4. The display device of claim 3, wherein the server stores a user interface provided by the at least one external device, wherein the controller is configured to receive a control code set of a specific external device providing a user interface matching the video image or the singularity coordinates of the video image from the server through the network interface.

5. The display device of claim 4, wherein the video image is a first video image obtained from the at least one external device by re-transmitting the power control code to the at least one external device through the remote controller.

6. The display device of claim 5, wherein the controller is configured to receive the control code set of the specific external device matching the first video image or singularity coordinates of the first video image among a plurality of external devices corresponding to the power control code from the server through the network interface.

7. The display device of claim 6, wherein the controller is configured to receive a specific function code of the at least one external device corresponding to the power control code from the server through the network interface,
wherein the specific function code is different from the power control code.

8. The display device of claim 7, wherein the video image is a second video image obtained by transmitting the specific function code to the at least one external device through the remote controller.

9. The display device of claim 8, wherein when the connected external device is a set top box, the user interface is a banner and the specific function code is a code corresponding to channel up or down control.

10. The display device of claim 9, wherein the controller is configured to provide an external device setting pop-up when the at least one external device is connected to the external device interface.

11. The display device of claim 10, wherein the controller is configured to control the display module such that the first video image and the second video image are not displayed through the display module.

12. A method for controlling a display device capable of being connected to at least one external device, the method comprising:

transmitting at least one external device power control code through a remote controller of the display device to an external device connected to the display device;

receiving a control code set including the transmitted power control code from a server through a network interface of the display device when a signal received from the at least one external device is blocked; and transmitting the received control code set to the remote controller to set the remote controller.

13. A method for controlling a display device capable of being connected to at least one external device, the method comprising:

transmitting a plurality of power control codes corresponding to a plurality of types from the display device to a set top box through a remote controller of the display device;

re-transmitting a specific power control code among the transmitted plurality of power control codes to the set top box through the remote controller to obtain a video image from the set top box when a signal transmitted from the set top box is blocked, wherein the specific power control code is transmitted to the set top box before the set top box is turned off;

receiving a control code set of a set top box providing a banner matching the video image from a server through a network interface of the display device; and transmitting the control code set of the set top box providing the banner matching the video image to the remote controller to set the remote controller.

14. The method of claim 13, wherein the receiving of the control code set includes:

receiving a channel up or down control code from the server through the network interface when there is no banner matching the video image;

transmitting the channel up or down control code to the set top box to obtain a video image again; and receiving a control code set of a set top box matching the video image obtained again.

\* \* \* \* \*